Jan. 10, 1956     A. P. BATEZELL ET AL     2,730,473
METHOD OF SPLICING INSULATED CONDUCTOR
Filed Dec. 31, 1953     2 Sheets-Sheet 1
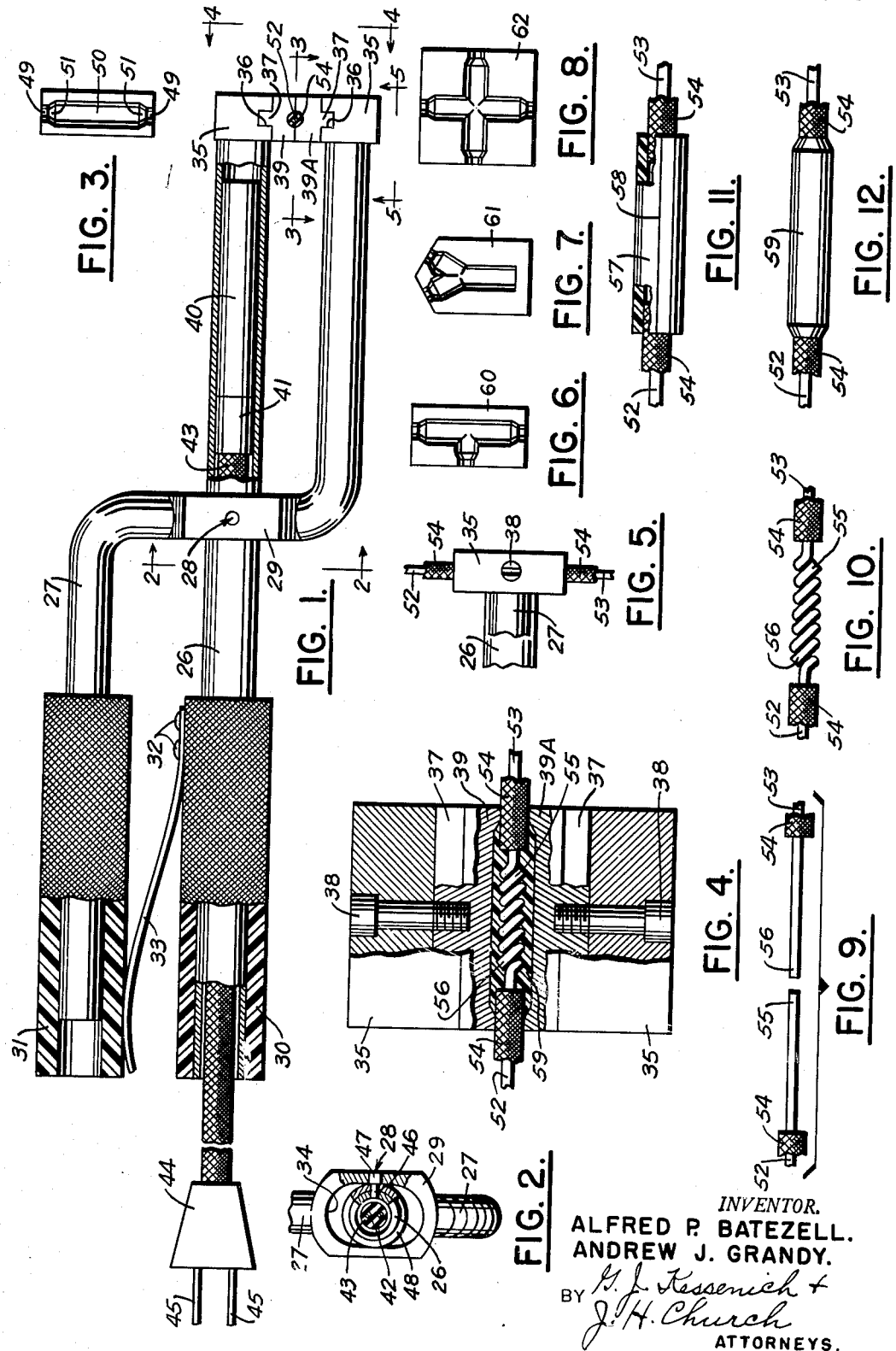
INVENTOR.
ALFRED P. BATEZELL.
ANDREW J. GRANDY.
BY *G. J. Kessenich* +
*J. H. Church*
ATTORNEYS.

Jan. 10, 1956     A. P. BATEZELL ET AL     2,730,473
METHOD OF SPLICING INSULATED CONDUCTOR
Filed Dec. 31, 1953     2 Sheets-Sheet 2
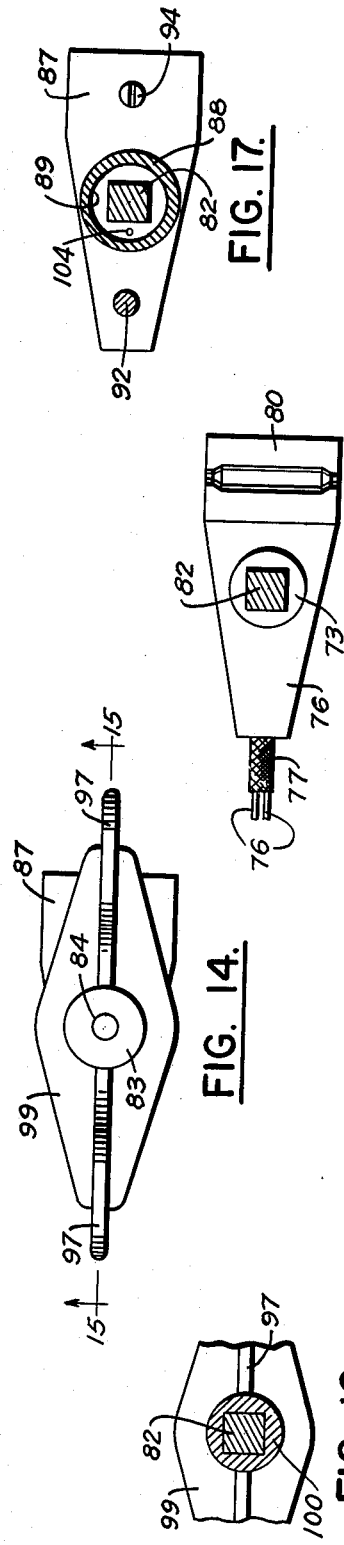
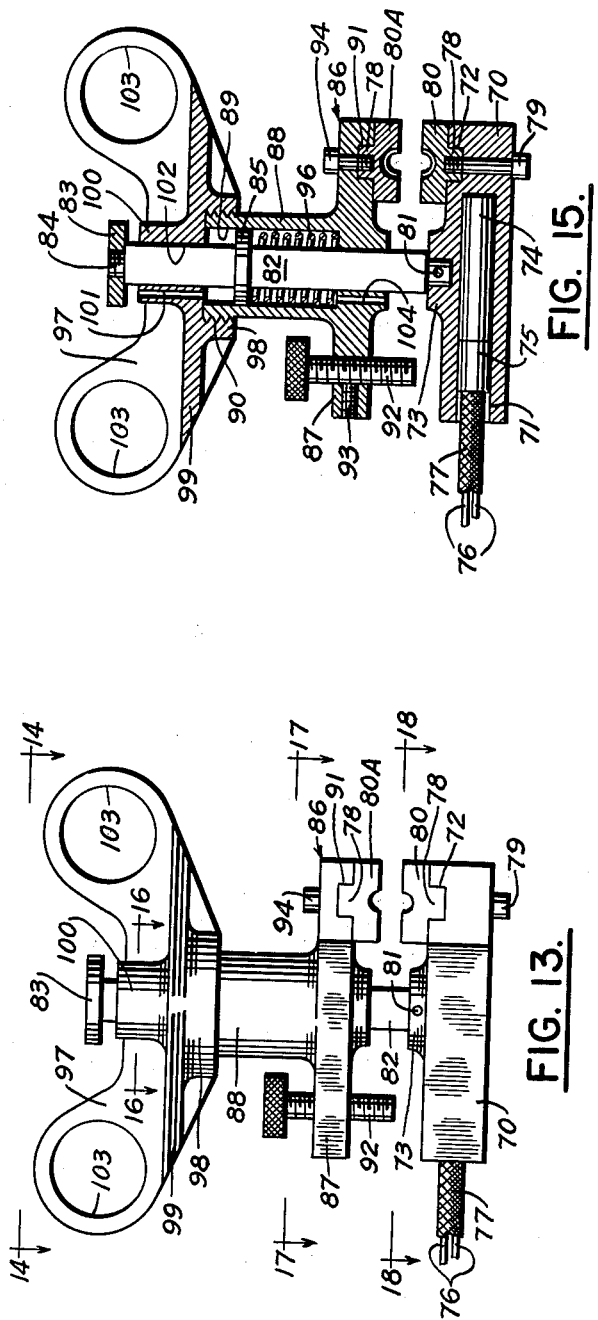
*INVENTOR.*
ALFRED P. BATEZELL.
ANDREW J. GRANDY.
BY *G. J. Kessenich &*
*J. H. Church*
ATTORNEYS.

United States Patent Office 2,730,473
Patented Jan. 10, 1956

2,730,473

METHOD OF SPLICING INSULATED CONDUCTOR

Alfred P. Batezell, Huntingdon Valley, and Andrew J. Grandy, North Hills, Pa.

Application December 31, 1953, Serial No. 401,736

3 Claims. (Cl. 154—2.22)

(Granted under Title 35, U. S. Code (1952), sec. 266)

The invention described herein may be manufactured and used by or for the Government for governmental purposes without payment of any royalties therein.

This application is a continuation-in-part of application Serial No. 77,972 which we filed on February 23, 1949, for "Molding Plastic Materials and Forming Seals Therewith," now abandoned.

Our invention refers to the molding of plastic materials and, while not limited solely thereto, has particular reference to the application of a plastic insulation to the covered type electric wires after they have been locally stripped of covering material and spliced.

Prior to our invention, after electric wires were spliced, it was customary to employ one of numerous available means for covering the wires as to solder the joint, then to wrap it with rubber tape, then with ordinary friction tape. In some cases, even more than rubber and friction tape wrapping was required. It would then be necessary further to continue the process of recoating until the required sequence of layers of insulation had been applied over the splice. These operations were done manually and, as is quite obvious, were very tedious and time consuming. Other old methods, such as using "spaghetti" or "painted on" insulating materials were likewise unsatisfactory for one reason or another. As a result of our present invention, however, it is now possible to apply insulating covering to spliced electric wires in a very effective and expeditious manner.

One object of our invention is to provide very simple means for applying insulation over a splice of the covered type electric wires.

Another object is to provide a rapid means for applying a more permanent and relatively weather-impervious seal than those generally used heretofore for such splice coverings.

A further object is to provide a means for covering exposed electric wires, junctions and terminals thereof with suitable plastic material in a manner suitable for use with mechanical hand compression devices.

A still further object is to provide a method of applying an insulating covering which is amenable to mass production techniques.

The foregoing and other objects of our invention will become evident from a study of the following specifications and drawings wherein:

Fig. 1 is a view in side elevation, partly in section, of an insulation applicator for use with a thermoplastic insulating material and containing a split mold, i. e. a mold consisting of a pair of complementary blocks for use in insulating a straight splice;

Fig. 2 is a transverse section along line 2—2 of Fig. 1;

Fig. 3 is a plan view of a single mold block taken along line 3—3 of Fig. 1, the block having been removed from the instrument;

Fig. 4 is an enlarged end view of the split mold, partly in section, taken from line 4—4 of Fig. 1;

Fig. 5 is a bottom view of the lower mold block, as seen from line 5—5 of Fig. 1;

Fig. 6 is a plan view similar to Fig. 3 but showing a mold block shaped to accommodate a T-shaped splice;

Fig. 7 is a plan view similar to Fig. 3 but showing a mold block shaped to accommodate a Y-shaped splice;

Fig. 8 is a plan view similar to Fig. 3 but showing a mold block shaped to accommodate a cross-shaped splice;

Figs. 9, 10, 11 and 12 are enlarged views showing the principal progressive steps involved in forming and applying preformed insulating material to a representative splice formed by joining two wires in substantial co-axial alignment;

Fig. 13 is a view in side elevation of a modification of the Fig. 1 instrument;

Fig. 14 is a view taken from line 14—14 of Fig. 13 to show that modified apparatus as it appears from above;

Fig. 15 is a vertical longitudinal section as seen from line 15—15 of Fig. 14;

Fig. 16 is a section through a central part of the illustrated alternate form of apparatus usable in the practice of our invention as seen from line 16—16 of Fig. 13;

Fig. 17 is a similar section taken from line 17—17 of Fig. 13; and

Fig. 18 is a similar section as seen from line 18—18 of Fig. 13.

At the outset it should be understood that the apparatus shown in Figs. 1 and 13 are merely illustrative of devices which can be employed in practicing our invention. With either one we first apply a preformed thermoplastic insulating material to two or more wires after they have been locally stripped of their original insulation covering at adjacent ends and spliced together.

In practicing our invention we preferably may employ the plier-like instrument of Fig. 1 consisting basically of a straight tubular member 26 and a solid step-like member 27. These two members are pivotally connected by means of oppositely placed pins 28 (one of which is shown) which pass through a ring-like protrusion 29 (see Fig. 2) on member 27 and into member 26 in a manner later to be described.

To the reader's left of the pivot pin 28 in Fig. 1, it will be seen that the members 26 and 27 are provided with tubular hand grips 30 and 31, respectively, of heat resistant, electrically non-conducting material, which are force fitted into place on members 26 and 27.

Attached to hand grip 30 by means of suitable fasteners 32 is a resilient member 33 in the form of a flat spring which constantly urges the two members 26 and 27 to diverge, turning about pivot pins 28, the amount of this divergence being limited by the size of opening 34 in ring-like protrusion 29 on member 27 (see Fig. 2).

Since, without any force on the hand grips 30 and 31 to overcome the resilience of spring 33, the two members 26 and 27 would normally pivotally diverge about pins 28, it will be assumed in Figs. 1, 2 and 4 that the force required to overcome the resilience of spring 33 has been applied as by grasping the instrument in the operator's hand (not shown) and that the instrument's split mold is for this reason shown in the closed or working position.

At the reader's extreme right end of the Fig. 1 apparatus there will be seen mold block holders 35 attached to members 26 and 27 as by welding or like process and each having an oppositely facing groove 36. Fitting into these opposed grooves 36 by means of tongues 37, are opposed complementary mold blocks 39—39A, being secured there against movement by screws 38 (see Fig. 4). The action of these blocks will be described more fully later.

Located frictionally tight in the straight tubular member 26 of the Fig. 1 apparatus near the mold block holder 35 is a combination electric heating element 40 and thermostat 41 of any well known construction. This heating unit is supplied electric current by wires 42 (see Fig.

2) housed in the heat resistant covering 43 which terminate in a suitable plug 44 where they are attached to prongs 45 which in turn are connectable to any suitable source of A. C. or D. C. electricity (not shown).

When heating element is connected to a suitable source of A. C. or D. C. current by plugging prongs 45 into an electrical receptacle (not shown), heat from element 40 travels by conduction and by radiation through tubular member 26 and adjacent mold block holder 35 to the mold block 39. Upon converging members 26—27 by pressure on hand grips 30 and 31, the heat is transferred by conduction from mold block 39 to mold block 39A. Proper operating temperature of the heating element 40 is assured by the action of thermostat 41.

The pivotal connection between members 26 and 27 is clearly shown in Fig. 2 and is accomplished by means of the oppositely located pins 28 (only one of which is shown) having a stem portion 46 and a head portion 47. Stem portion 46 is pressed into a hole which extends through member 26 and a collar 48 which is attached to that member as by welding. The head portion 47 is free to rotate in a hole in the ring-like portion 29 of member 27, and also allows limited insertion of stem portion 46 into collar 48 and member 26.

Referring to the complementary mold blocks 39 and 39A (the latter is shown in Fig. 3), each mold is semi-circularly recessed to contain one half of the combined split mold's cavity. When the molds 39 and 39A, each containing half the cavity, are together and in alignment (by means earlier mentioned), the corresponding recesses in each mold conform to create a continuous cylindrical mold cavity. One preferred shape for half the total mold cavity is shown in Fig. 3 and is seen to consist of a neck portion 49 at each end, a central semi-cylindrical portion 50, and a tapered intermediate section 51 joining each neck portion 49 with the central portion 50.

When the molds 39 and 39A are together and aligned the opposing neck portions 49 completely and snugly surround the corresponding ends of the original wire covering as shown in Fig. 4, thereby preventing accidental movement of the instrument or the wires being covered and also preventing any seepage out from the molds of the insulating material while it is in the plastic state. The two opposing central portions 50 create a cylindrical cavity of somewhat larger diameter and length than the splice thereby affording ample space to be filled by the new insulating wire-covering material when it is heated to a plastic state. The two pairs of opposing tapered intermediate sections 51 from a cavity of gradually decreasing size from the larger central portion 50 to the smaller neck portions 49 and provide means for causing the original covering material to become impregnated with the newly applied insulation thus resulting in a tight bond between each end of the applied insulation and the original covering which will prevent dirt, moisture or the like from making contact with the splice.

The enlarged view, Fig. 4, clearly shows a composite picture of our novel molding means and technique. Here, two representative wires 52—53 are shown stripped of their original covering material 54 adjacent wire ends 55 and 56, respectively, and are spliced together in a straight splice. Our preformed plastic insulating material 57 of proper size and longitudinally split at 58 (see Fig. 11), is placed in the illustrated position over the splice and the assemblage is placed between the previously heated mold blocks 39 and 39A. The heat and pressure supplied to the mold blocks them cause the insulating material 57 to assume the shape of the mold cavity; and also cause welding or fusion of the insulating material along the split 58 forming a solid, durable covering 59 over the splice (see Fig. 12).

Fig. 5 depicts, among other things, two newly joined wires 52 and 53 in the act of being re-covered with insulating material by the Fig. 1 apparatus, and how the wires are held in alignment by the mold blocks 39 and 39A.

In the illustrative instrument complementary mold blocks 39—39A can be removed and other pairs of mold blocks having variously shaped cavities can be mounted in the mold holding blocks 35 to accommodate any type of splice on any size wire. For instance, in Fig. 6, which is similar to Fig. 3, there is shown a plan view of one of a pair of mold blocks having a T-shaped mold recess such as could be used with its complementary block (not shown) in insulating a splice formed where one wire is tapped onto an unbroken wire. The type of mold cavity shown in Fig. 7 is that of one of a pair of mold blocks 61 which could be used with its complementary mold to insulate a splice formed by joining the ends of two converging wires (not shown). Fig. 8 shows the type of mold recess in each of a pair of mold blocks 62 for use in insulating a splice formed where two unbroken wires (not shown) cross each other.

It should be understood that each alternate form of mold block is made with the same size tongue and screw hole as utilized in mold blocks 39 and 39A, and hence are interchangeably mountable on members 26—27 of the Fig. 1 apparatus. It will also be noted that the necks 49 and intermediate portions 51 are also common to all mold blocks. By changing the mold blocks to ones having recesses which are larger or smaller than those shown in the drawings, it is possible to apply insulation to a splice of practically any size wire having any size original covering.

Another advantage accruing from the use of our novel split sheaths and method for applying same is the elimination of the necessity for soldering a splice prior to applying insulating covering thereover. This result occurs since the applied insulating material 59 is tough and strong, and is itself able firmly to hold the wires in good electrical contact.

Figs. 9–10–11–12 illustratively show a representative sequence of steps of our invention, practiced in this instance with the aid of the apparatus of Fig. 1. In Fig. 9, portions of the two wires 52—53 terminating in adjacent ends 55 and 56 are represented as having been stripped of the orignal covering 54 for a distance sufficient to allow splicing. In Fig. 10, the adjacent wire ends 55 and 56 are shown wrapped around each other to form the splice. The next step, shown in Fig. 11, consists of placing a sufficiently long piece of preformed tubular thermoplastic insulating material 57, split longitudinally at 58, over the splice and over a portion of the orignal covering 54 at each side of the splice. The Fig. 11 assemblage is now placed into the molds 39—39A of the Fig. 1 instrument which has been heated to proper temperature by previous connection of plug 44 bearing prongs 45 to a source of electric current. The molds are squeezed together by hand pressure on grips 30 and 31. The heat from the upper mold block 39 is conducted by contact to the lower mold block 39A. As a result of the heat and compression, the insulating material 57 becomes molded to the shape of the cavity 50 and causes the plastic material to fuse at the longitudinal split 58 resulting in the durable uninterrupted casing 59 shown in Fig. 12. This is all accomplished in a very short time. Then pressure on grips 30—31 is released, whereupon the spring 33 causes members 26—27 to diverge and mold blocks 39 and 39A to separate, and the completed splice is removed from the apparatus or vice versa.

Another form of the Fig. 1 instrument which may be employed in practicing our invention is that illustrated in Figs. 13 to 18 inclusive. Our novel preformed, longitudinally split tubular thermoplastic insulating material is also employed in this instrument. This modified instrument consists of a base member 70 having a cylindrical recess 71 (see Fig. 15) extending in from the left end, a groove 72 and a lug 73 extending from its upper surface.

Cylindrical recess 71 contains, frictionally tight, a combination heating element 74 and thermostat 75. This unit is supplied by wires 76 protected by heat resistant covering 77. The wires 76 terminate in an electrical plug (not shown) which is connectable to any suitable source of A. C. or D. C. electricity (not shown).

When the element 74 is heated, the heat is transmitted by conduction through the base member 70 to lower mold block 80 which is secured in a groove 72 in said base by means of a tongue 78 and a screw 79. From block 80 the heat is transferred to upper mold block 80A by conduction when the two blocks are closed. The proper operating temperature of the mold blocks is controlled by the action of thermostat 75.

Extending perpendicularly upward from lug 73 in base 70, and secured in position by pin 81, is a square cross-sectioned post 82 atop which is mounted a pad 83 by means of thread 84. Integral with post 82 is a cylindrical flange 85. Slidably connected to post 82 is a movable member 86 which consists of a lower portion 87 from which extends vertically a cylindrical lug 88 having the circular recess 89. At its upper end lug 88 is provided with external threads 90. The lower portion 87 of movable member 86 is provided with a groove 91, an adjusting screw 92 and a lock screw 93. Seated in groove 91 by means of a tongue 78 and retained in alignment with mold block 80 by screw 94 is upper mold block 85A whose recess (similar to 50 in Fig. 3) is complementary to that of the lower mold block 80. Of course, just as was explained for the Fig. 1 apparatus, complementary mold blocks of any convenient size or shape (not shown) can be provided in order to insulate any type splice in any size wire.

Located in circular recess 89 of lug 88 is a helically coiled spring 96, one of whose ends abuts the lower surface of flange 85 and whose opposite end pushes against the bottom of the recess 89, whereby constantly to urge the movable member 86 carrying mold block 80A against the fixed base member 70 carrying mold block 80. Depending on the combined thickness of a particular pair of mold blocks, the spacing between the fixed member 70 and movable member 86 can be varied by screw 92 which is adjusted to just allow the mold blocks to close, and to thus minimize any tendency for the movable member 86 to bind against either the flange 85 or the post 82.

Attached to the upper threaded end 90 of lug 88 is a winged cap 97 consisting of an internally threaded lug 98 extending from the underside of a flat portion 99, an upper lug 100 extending from the upper side of the flat portion, a square hole 102 which slidably surrounds vertical post 82 and a vent hole 101 for permitting escape of air from recess 89. Another vent hole 104 which aids in this last named function is provided in the sliding member 86. The wings of cap 97 are opened at 103 to provide, as a matter of convenience, for insertion of the operator's fingers during use of our apparatus.

In considering Figs. 14 and 15 it is to be assumed that pressure has been placed upon pad 83, as by depressing with the thumb (not shown), thereby causing separation of the fixed and movable members 70 and 86 as would be done preparatory to using our inventive instrument.

Figs. 14, 16, 17 and 18 show further construction details of the modified instrument places correspondingly indicated on Fig. 13, and will not require further discussion since all salient features have been mentioned. Note, however, that spring 96 has been removed in Fig. 17.

In using the just described Fig. 13 alternate form apparatus to insulate a splice, the wires are prepared as was illustrated in Figs. 9, 10 and 11. After allowing the heating element to reach its proper operating temperature, the mold blocks 80 and 80A are separated by one hand, two fingers engaging openings 103 and pulling cap 97 upward while the thumb presses downward on pad 83, and the plastic covered splice assemblage (like that of Fig. 11), positioned in one of the mold recesses. When thumb and finger pressure is released, spring 96 causes the mold blocks 80 and 80A to close. After sufficient time has elapsed, during which the operator is free to perform other work, the longitudinally split tubular insulation will have fused and the plastic insulating material will have assumed the shape of the mold (as e. g. 59 in Fig. 12). By thumb and finger coaction the mold blocks are again separated, and the completed splice is removed from the tool or vice versa.

Even though the foregoing specification has dealt with a method and article exceedingly useful in the application of insulation over a splice in electric wiring, it is easily conceivable that they could be used to apply a plastic covering to many other objects for purposes other than to provide electrical insulation. For example, to mention one of many uses, our invention could be used to apply a plastic covering to objects in cases where protection from the action of deleterious agents such as water, oil, heat, acid liquids and gases, or the like was necessary. Other uses could be for insulating such objects as electrical resistors, condensers, etc. Still another important use of our inventive device resides in applying a plastic insulating material to an electric wire—electric terminal junction, or like application, for the dual purpose of providing insulation and reinforcement against fatigue failure at that point. Hence, the word "insulation" may be construed to mean an electrically non-conductive covering or a protective covering of some kind. Furthermore, in the case of applying a protective covering, the wire may or may not be spliced, and it may or may not have an original covering. In any of these situations our invention will be equally useful.

It will thus be seen that by our invention we have provided a very simple means for applying insulation over a splice of the covered type electric wires; that we have provided rapid means for applying a more permanent and relatively weather-impervious seal than those generally used heretofore, that we have provided means for covering exposed electric wire, junctions and terminals thereof with a plastic material in a manner suitable for use with mechanical hand compression devices; and that we have provided a method of applying an insulating covering which means is amenable to mass production techniques.

In view of the foregoing, it is obvious that our invention is extensive in its adaption and we therefore do not wish to be limited to the narrow confines of the application as here discussed by way of illustration only, since many other variations are possible without departing from the spirit and scope of our invention.

We claim:

1. The method of joining the ends of two insulated electrical conductors comprising the steps of removing a sufficient quantity of insulation from the ends of said conductors to be joined, splicing the bared ends of said conductors, positioning a pair of preformed semi-cylindrical thermoplastic sheets to encompass substantially the spliced portion of said conductors and an adjacent portion of the insualtion of each of said conductors, and simultaneously bonding said pair of sheets to each other and to said insulation by application of heat to said pair of sheets thereby to form a tight seal around the splice.

2. The method of joining the ends of two insulated electrical conductors comprising the steps of stripping the insulation from the ends of said conductors to be joined, splicing the bared ends of said conductors, positioning a plurality of preformed longitudinal strips of thermoplastic insulating material in a manner substantially to encompass the spliced portion of said conductors and an adjacent portion of the insulation of each of said conductors, and simultaneously bonding said strips to each other and to said insulation by application of heat and pressure to said strip material thereby to form a tight seal around the splice.

3. The method of joining the ends of at least two insulated electrical conductors comprising the steps of stripping the insulation sufficiently from the ends of said conductors to be joined, splicing the bared ends of said conductors, positioning a plurality of longitudinal strips of thermoplastic insulating material in a manner substantially to encompass the spliced portion of said conductors and an adjacent portion of the insulation of each of said conductors, and simultaneously bonding said strips to each other and to said insulation through the application of heat and pressure to the exterior surfaces of said strips thereby to form a tight seal around the joined conductor ends.

References Cited in the file of this patent

UNITED STATES PATENTS

| | | |
|---|---|---|
| 1,479,362 | Bowman | Jan. 1, 1924 |
| 1,997,297 | Fuchs | Apr. 9, 1935 |
| 2,276,571 | Grypma | Mar. 17, 1942 |
| 2,288,918 | Parker | July 7, 1942 |
| 2,402,451 | Scott et al. | June 18, 1946 |
| 2,407,683 | Prentice | Sept. 17, 1946 |

FOREIGN PATENTS

| | | |
|---|---|---|
| 602,395 | Germany | Sept. 1934 |